(12) United States Patent
Mei et al.

(10) Patent No.: US 10,837,321 B2
(45) Date of Patent: Nov. 17, 2020

(54) METHOD AND SYSTEM OF EFFICIENCY EVALUATION OF RCAES SYSTEM

(71) Applicant: TSINGHUA UNIVERSITY, Beijing (CN)

(72) Inventors: Shengwei Mei, Beijing (CN); Laijun Chen, Beijing (CN); Feng Liu, Beijing (CN); Bin Liu, Beijing (CN); Cheng Wang, Beijing (CN); Zhaojian Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 994 days.

(21) Appl. No.: 15/542,665

(22) PCT Filed: Jun. 30, 2014

(86) PCT No.: PCT/CN2014/081173
§ 371 (c)(1),
(2) Date: Jul. 11, 2017

(87) PCT Pub. No.: WO2016/000133
PCT Pub. Date: Jan. 7, 2016

(65) Prior Publication Data
US 2018/0080346 A1 Mar. 22, 2018

(51) Int. Cl.
*F01K 13/00* (2006.01)
*F02C 6/16* (2006.01)
(Continued)

(52) U.S. Cl.
CPC .............. *F01K 13/003* (2013.01); *F01K 3/02* (2013.01); *F01K 7/16* (2013.01); *F01K 13/006* (2013.01); *F02C 6/16* (2013.01); *Y02E 60/16* (2013.01)

(58) Field of Classification Search
CPC . F01K 13/003; F01K 3/02; F01K 7/16; F01K 13/006; F02C 6/16; Y02E 60/15
See application file for complete search history.

(56) References Cited

U.S. PATENT DOCUMENTS

| | | | |
|---|---|---|---|
| 9,217,423 B2 | 12/2015 | Chen et al. | |
| 2009/0217898 A1 | 9/2009 | Gokhale et al. | |

FOREIGN PATENT DOCUMENTS

| | | | |
|---|---|---|---|
| CN | 1482349 A | 3/2004 | |
| CN | 102052256 A | 5/2011 | |

(Continued)

OTHER PUBLICATIONS

Samir Succar et al., "Compressed air energy storage: theory, resources, and applications for wind power," 2008, Princeton Environmental Institute, 81 pages (Year: 2008).*

(Continued)

*Primary Examiner* — Kamini S Shah
*Assistant Examiner* — Russ Guill
(74) *Attorney, Agent, or Firm* — Marshall, Gerstein & Borun LLP

(57) ABSTRACT

An efficiency evaluation method of an RCAES system is disclosed, and the method includes calculating electric energy charged by an electric power system in a compression process, calculating electric energy discharged to the electric power system in an expansion process, and calculating a ratio of the electric energy discharged in the expansion process to that charged in the compression process, and taking the ratio as an efficiency of the whole RCAES system; wherein gas in operation is ideal gas, air mass flow rates in the compression and expansion processes are known and constant in operation, an isothermal model is adopted for the CASV of which the temperature is the same with ambient circumstances, and the temperature and pressure of com- (Continued)

pressed air after throttling become constant. A corresponding system is also disclosed.

18 Claims, 6 Drawing Sheets

(51) Int. Cl.
*F01K 3/02* (2006.01)
*F01K 7/16* (2006.01)

(56) References Cited

FOREIGN PATENT DOCUMENTS

| | | |
|---|---|---|
| CN | 102518480 A | 6/2012 |
| CN | 102661175 A | 9/2012 |
| CN | 103225598 A | 7/2013 |

OTHER PUBLICATIONS

Georg Kleiser et al., "Dynamic modelling of compressed air energy storage for small-scale industry applications," 2013, International Journal of Energy Engineering, vol. 3, issue 3, 11 pages (Year: 2013).*
D.K. Kreid, "Technical and economic feasibility analysis of the no-fuel compressed air energy storage concept," 1976, Battelle Pacific Northwest Laboratories, 70 pages (Year: 1976).*
Search Report in International Application No. PCT/CN2014/081173 dated Mar. 30, 2015, 2 pages.

* cited by examiner

GEN: generator; EP: electric power; DEC: decelerator; TUR: turbine; HE: heat exchanger; H/L-TES: high/low-temperature TES; COM: compressor

METHOD AND SYSTEM OF EFFICIENCY EVALUATION OF RCAES SYSTEM

CROSS-REFERENCE TO RELATED APPLICATION

The present disclosure is a national phase application of PCT Patent Application No. PCT/CN2014/081173, entitled "METHOD AND SYSTEM OF EFFICIENCY EVALUATION OF RCAES SYSTEM" filed on Jun. 30, 2014 with the Patent Office of the People's Republic of China, the disclosure of which is incorporated by reference in its entirety.

TECHNICAL FIELD

The present disclosure relates to a field of a power generation system, and particularly to a method and a system of efficiency evaluation of a RCAES (Regenerative Compressed Air Energy Storage) system.

BACKGROUND

Due to the uncertainty and anti-peaking nature, integration of large scale renewable energy brings great challenges to the operation and dispatch of a power system. CAES (Compressed Air Energy Storage) system provides new ideas to solve this problem as its characteristics of fast regulating, flexible location and long service life. Especially, the RCAES system is widely concerned as it can collect a part of heat released in a compression process and release this part of heat in a work process of air expansion, so that the energy-conversion efficiency of the whole power system can be improved. At present, few works have been done on efficiency evaluation and analysis of the RCAES system.

SUMMARY

In one aspect of the present invention, an efficiency evaluation method of an RCAES system is provided, the RCAES system includes parts of compression, thermal energy storage, compressed air storage vessel (CASV) and expansion; and the method includes calculating electric energy charged by an electric power system in a compression process, calculating electric energy discharged to the electric power system in an expansion process, and calculating a ratio of the electric energy discharged in the expansion process to that charged in the compression process, and taking the ratio as an efficiency of the whole RCAES system; wherein gas in operation is ideal gas, air mass flow rates in the compression and expansion processes are known and constant in operation, an isothermal model is adopted for the CASV of which the temperature is the same with ambient circumstances, and the temperature and pressure of compressed air after throttling become constant.

In another aspect of the present invention, an efficiency evaluation system of the RCAES system is provided, and the system includes modules: a first module, for calculating electric energy charged by an electric power system in a compression process; a second module, for calculating electric energy discharged to the electric power system in an expansion process; and a third module, for calculating a ratio of the electric energy discharged in the expansion process to that charged in the compression process, and taking the ratio as an efficiency of the whole RCAES system; wherein gas in operation is ideal gas, air mass flow rates in the compression and expansion processes are known and constant in operation, an isothermal model is adopted for the CASV of which the temperature is the same with ambient circumstances, and the temperature and pressure of compressed air after throttling become constant.

In another aspect of the present invention, a non-transitory machine-readable storage medium, storing instructions to cause a machine to execute the above method, is provided.

DETAILED DESCRIPTION

Examples will now be described more fully with reference to the accompanying drawings.

Embodiments of the present invention provide a method of efficiency evaluation of a RCAES system under basic formulation assumptions based on electrical-mechanical-thermal dynamic processes and measurable parameters of the RCAES system. In the embodiments of the present invention, impacts of key parameters of the RCAES system including compression ratio (CR) of compressor, exhaust air pressure of throttle (EAPT) and/or maximum working pressure (MWP) of compressed air storage vessel (CASV) are considered in efficiency evaluation of the whole system. Hereinafter, Part 1 introduces the basic formulation assumptions of the method of efficiency evaluation of the RCAES system provided in the embodiments of the present invention, Part 2 describes a calculation method of the efficiency of the whole RCAES system, and Part 3 discusses the impacts of the compression ratio of a compressor, the exhaust air pressure of a throttle and the maximum working pressure of compressed air storage vessel (CASV) on the efficiency of the RCAES system through a practical application case of the present invention.

1 Basic Formulation Assumptions

Figure 1:
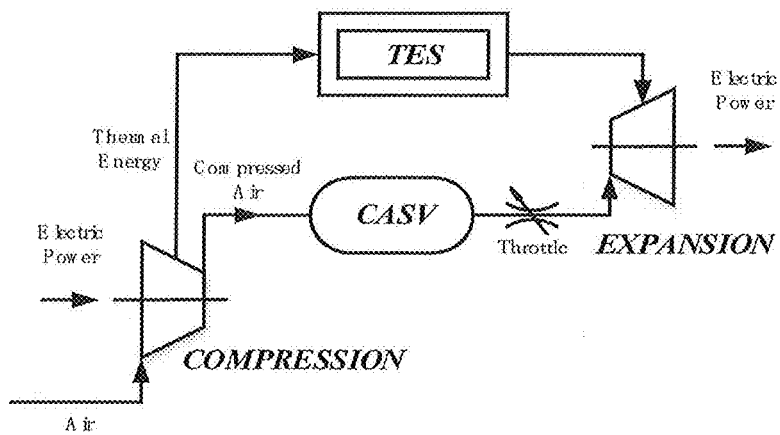
FIG. 1 is a diagram showing a general structure of a RCAES system in an embodiment of the present invention.

A general structure of the RCAES system in the embodiments of the present invention is shown in FIG. 1, including four main parts: compression, thermal energy storage (TES), compressed air storage vessel (CASV) and expansion. Efficiency analysis of the RCAES system in the embodiments of the present invention is based on the following assumptions:

1) Gas in operations is ideal gas;

2) The air mass flow rates in compression and expansion processes are known and constant in operation; the compression ratios of all stages of compressor are identical, and the expansion ratios of all stages of turbine are identical;

3) An isothermal model is adopted for the CASV of which the temperature is the same with ambient circumstances; the air pressure inside the CASV changes along with air inflow of the compressor; and the exhaust air pressure of the last stage of the compressor is kept identical with the air pressure inside the CASV, so the last stage of the compressor is called unsteady stage of compression; and 4) The temperature and pressure of compressed air after throttling become constant, and each expansion stage of the turbine is a steady process.

2 Efficiency Evaluation of the Whole RCAES System

In a conventional efficiency evaluation method for a CAES system, output electric energy and input electric energy is obtained by measurement, and the efficiency is indicated by the ratio of the output electric energy to input electric energy. However, this method is hardly to be extended to be applied in analysis the impacts of the key parameters on the system's efficiency or optimizing the system's key parameters. To cope with the deficiency, an efficiency evaluation method based on energy conversion of compression and expansion processes is provided in the embodiments of the present invention, which considers the impacts of the key parameters in the compression and expansion processes on the efficiency of the whole system.

2.1 Energy Conversion in Compression Process

In the complicated compression process, the RCAES system is charged with electric power of which one part is stored in high-pressure air as molecular potential energy and the other part is stored in high-temperature water as thermal energy. However, the closely involved electric power and compression work can be illustrated with the compression efficiency defined as follows:

Compression Efficiency:

the ratio of compression work to electric energy charged in compression process, indicated by $\eta_{com}$.

As the compression efficiency is determined by the electric-mechanical power conversion efficiency and adiabatic efficiency of the compressor both being approximately constant from engineering perspective, the compression efficiency of RCAES system can be described as a known parameter when analyzing the system efficiency. Therefore, if the compression work that has been done on the compressed air is obtained, the electric energy charged from the electric power system can be calculated out.

To facilitate description of the energy conversion process, without loss of generality, it is further assumed that:

1) The compression process starts when the pressure of the CASV reaching its minimum value $p_{stor}^0$ and ends when the pressure reaching its maximum value $p_{stor}^1$. Besides, $p_{stor}^0$ and the EAPT $p_{val}$ are identical.

2) The compressor includes $N_c$ stages. The exhaust air pressure of the penultimate stage $N_{cs}$, indicated by $p_{N_{cs}}^{com}$, is lower than the minimum working pressure of the CASV, i.e., $p_{N_{cs}}^{com} < p_{stor}^0$, while the last stage is exactly the reverse, i.e., $p_{N_c}^{com} \geq p_{stor}^1$.

Hence, all the stages of the compressor work simultaneously during the system's air compression and energy storage process, where the first $1 \sim N_{cs}$ stages are steady with constant exhaust air pressure and temperature while the last stage is unsteady with time-variant pressure having the same value with the CASV. Once the above assumptions are not satisfied for a practical RCAES system, the compression process can be formulated in a multi-period way with the same methodology. Furthermore, the assumption that the temperature of the TES can be controlled to keep all stages excluding the first stage of the compressor constant and in the same temperature denoted as $T_{inc}$, which is common in engineering.

2.1.1 Compression Time

According to the assumptions in Part 1, the CASV adopts the isothermal model, and according to the state equation of ideal gas, $p_{stor} V_{stor} = m R_g T_{stor}$, the following formula can be obtained by differentiating both sides:

$$V_{stor} \frac{dp_{stor}}{dt} = \frac{dm}{dt} R_g T_{stor} \qquad (1)$$
$$= q_{com} R_g T_{stor}$$

where $p_{stor}$, $V_{stor}$, $T_{stor}$ are the pressure, volume and temperature of the CASV; m is the mass of air; $q_{com}$ is the exhaust air rate of compressor; $R_g$ is the gas constant.

Thus, the operation time of the compression process can be illustrated as follows:

$$t = \frac{V_{stor}(p_{stor} - p_{stor}^0)}{q_{com} R_g T_{stor}} \qquad (2)$$

where $p_{stor}^1$ is the minimum working pressure of the CASV.

2.1.2 Compression Work of Steady Stages

In the compression process, the compression powers of stages 1~Ncs remains unchanged and can be expressed as follows:

$$P_{N_{cs}}^W = \sum_{i=1}^{N_{cs}} \left\{ \frac{q_{com} R_g T_{in,i}^{com} K_i}{K_i - 1} \left[ \lambda^{\frac{K_i-1}{K_i}} - 1 \right] \right\} \qquad (3)$$

where $\lambda$ is the ratio of each stage of the compressor satisfying $$\lambda = \frac{p_{out,i}^{com}}{p_{in,i}^{com}} > 1$$

in which $p_{in,i}^{com}$, $p_{out,i}^{com}$ are inlet and exhaust air pressures of the $i^{th}$ stage; $K_i$ is the polytropic exponent of each stage of the compressor, and $T_{in,i}^{com}$ is inlet temperature of the $i^{th}$ stage of the compressor.

The polytropic exponent Ki of each stage is approximately identical in engineering which can be expressed as $\gamma$, and the inlet air temperature of each stage except the first stage of the compressor can be kept as $T_{inc}$ by the heat exchanger. Thus, formula (3) can be converted into the following expression:

$$P_{N_{cs}}^W = \frac{q_{com}R_g\gamma}{\gamma - 1}\left(\lambda^{\frac{\gamma-1}{\gamma}} - 1\right)[T_{in,1}^{com} + (N_{cs} - 1)T_{inc}] \quad (4)$$

The compression work of steady stages can then be illustrated as follows after the multiplication of formulas (2) and (4):

$$W_{N_{cs}}(p_{stor}) = P_{N_{cs}}^W t \quad (5)$$

$$= \frac{V_{stor}\gamma(p_{stor} - p_{stor}^0)\left(\lambda^{\frac{\gamma-1}{\gamma}} - 1\right)}{T_{stor}(\gamma - 1)}[T_{in,1}^{com} + (N_{cs} - 1)T_{inc}]$$

2.1.3 Compression Work of the Unsteady Stage

The last stage of the compressor is unsteady of which the exhaust air pressure is the same as the CASV's and the compression power of the last stage can be expressed as:

$$P_{N_c}^W(p_{stor}) = \frac{q_{com}R_gT_{inc}\gamma}{\gamma - 1}\left[\left(\frac{p_{stor}}{p_{in,N_c}^{com}}\right)^{\frac{\gamma-1}{\gamma}} - 1\right] \quad (6)$$

Furthermore, the compression work can be obtained after integrating the compression power on time basis as follows:

$$W_{N_c}(p_{stor}) = \int P_{N_c}^W dt \quad (7)$$

$$= \int \frac{P_{N_c}^W}{q_{com}T_{stor}R_g}dp$$

$$= \alpha_1\left[\left(\frac{p_{stor}}{p_{in,N_c}^{com}}\right)^{\frac{2\gamma-1}{\gamma}} - \left(\frac{p_{stor}^0}{p_{in,N_c}^{com}}\right)^{\frac{2\gamma-1}{\gamma}}\right] - \alpha_2(p_{stor} - p_{stor}^0)$$

where $\alpha_1 = \frac{T_{inc}V_{stor}\gamma^2\lambda^{N_{cs}}p_{in,1}^{com}}{T_{stor}(2\gamma - 1)(\gamma - 1)}$, $\alpha_2 = \frac{T_{inc}V_{stor}\gamma}{T_{stor}(\gamma - 1)}$.

In summary, the compression power and work can be expressed as a function of $p_{stor}$:

$$P_{com}^W(p_{stor}) = P_{N_{cs}}^W + P_{N_c}^W(p_{stor})$$

$$W_{com}(p_{stor}) = W_{N_{cs}}(p_{stor}) + W_{N_c}(p_{stor}) \quad (8)$$

Then, the electric energy charged during the compression process can be expressed as:

$$E_{com} = \frac{W_{com}(p_{stor}^1)}{\eta_{com}} \quad (9)$$

2.2 Energy Conversion in Expansion Process

In the expansion process, the high-pressure air from the CAVS changes into constant-temperature and isopiestic air after throttling, and then drives the turbine to generate electric power after exchanging heat with the TES system. Similar to the compression process, the relationship of expansion work and electric energy can be illustrated by the expansion efficiency defined as follows:

Expansion Efficiency:

the ratio of electric energy discharged to expansion work, indicated by ηtur.

The expansion efficiency is codetermined by the adiabatic efficiency of the turbine, the mechanical efficiency of the regulator and the efficiency of the electric generator which are all known and fixed parameters. Consequently, the expansion efficiency can also be assumed constant from the engineering perspective. Therefore, if the expansion work that the compressed air has done is obtained, the electric energy discharged to the electric power system can be calculated out.

Due to the throttle's effect, all stages are steady in the expansion process. Supposing the inlet air temperatures of all stages are identical and kept constant which is indicated by $T_{int}$ and the polytropic exponent is indicated by μ, the expansion power can be expressed as follows:

$$P_{N_t}^W = -\frac{N_t q_{tur}R_g T_{int}\gamma}{\mu - 1}\left(\phi^{\frac{\mu-1}{\mu}} - 1\right) \quad (10)$$

where Nt is the stage number of the turbine; φ is the ratio of each stage satisfying $$\phi = \frac{p_{out,i}^{tur}}{p_{in,i}^{tur}} < 1$$

in which $p_{in,i}^{tur}$, $p_{out,i}^{tur}$ are respectively the inlet air pressure and exhaust air pressure in the $i^{th}$ stage of the turbine, and $q_{tur}$ is the exhaust air rate of the turbine.

The pressure of the CASV over time can be obtained in the same way as described in 2.1.1, which is illustrated as follows:

$$t = \frac{(p_{stor}^1 - p_{stor})V_{stor}}{q_{tur}R_g T_{stor}} \quad (11)$$

Hence, the expansion work can be expressed as a function of $p_{stor}$ after multiplication of the formulas (10) and (11):

$$W_{tur}(p_{stor}) = P_{N_t}^W t \quad (12)$$

$$= \frac{N_t T_{int}\mu V_{stor}(p_{stor}^1 - p_{stor})}{T_{stor}(\mu - 1)}\left(1 - \phi^{\frac{\mu-1}{\mu}}\right)$$

The electric energy discharged by the RCAES system can then be expressed as the multiplication of the expansion work and the expansion efficiency:

$$E_{tur} = W_{tur}(p_{stor})\eta_{tur} \quad (13)$$

Finally, the efficiency of the RCAES system can be calculated as follows:

$$\eta_{RCAES} = \frac{E_{tur}}{E_{com}} = \frac{W_{tur}(p_{stor}^0)}{W_{com}(p_{stor}^1)}\eta_{com}\eta_{tur} \quad (14)$$

where $W_{tur}(p_{stor}^0)$ is the expansion work that the compressed air has done when the pressure of the CAVS decreases from $p_{stor}^1$ to $p_{stor}^0$, and $W_{com}(p_{stor}^1)$ is the compression work that has been done on the compressed air when the pressure of the CAVS increases from $p_{stor}^0$ to $p_{stor}^1$.

Substituting formulas (8) and (12) to formula (14), the expression of the whole RCAES system's efficiency is as follows:

$$\eta_{RCAES} = \frac{c_1 z_1}{c_2 z_2 + c_3 z_3 - c_4 z_1} \quad (15)$$

where $$c_1 = \frac{N_t T_{int} \mu}{(\mu - 1)} \left(1 - \phi^{\frac{\mu-1}{\mu}}\right), \; c_2 = \frac{\gamma[T_{in,1}^{com} + (N_{cs} - 1)T_{inc}]}{(\gamma - 1)};$$

$$c_3 = \frac{T_{inc} \gamma^2 p_{in,i}^{com}}{(2\gamma - 1)(\gamma - 1)}, \; c_4 = \frac{T_{inc} \gamma}{(\gamma - 1)};$$

$$z_1 = p_{stor}^1 - p_{stor}^0; \; z_2 = \left(\lambda^{\frac{\gamma-1}{\gamma}} - 1\right)(p_{stor}^1 - p_{stor}^0);$$

$$z_3 = \lambda^{N_{cs}} \left[\left(\frac{p_{stor}^1}{\lambda^{N_{cs}} p_{in,1}^{com}}\right)^{\frac{2\gamma-1}{\gamma}} - \left(\frac{p_{stor}^0}{\lambda^{N_{cs}} p_{in,1}^{com}}\right)^{\frac{2\gamma-1}{\gamma}}\right].$$

According to the above formula, the efficiency of the RCAES system is a nonlinear function of $\lambda$, $p_{val}(=p_{stor}^0)$ and $p_{stor}^1$.

According to the above formulas provided by the embodiments of the present invention, the efficiency of the whole RCAES system can be calculated, and the key parameters of various processes of the system such as compression ratio of the compressor, the exhaust air pressure of the throttle and the maximum working pressure of the CAVS are adopted in the calculation of the efficiency. Thus, the efficiency evaluation method of the embodiments of the present invention can consider the impacts of various processes in the system on the efficiency of the whole system.

2.3 Key Parameters' Impacts on the RCAES Systems' Efficiency 2.3.1 the Impact of the Compression Ratio-$\lambda$ When the compression ratio increases, more electric energy will be charged into the RCAES system and more thermal energy will be released by the compressor and absorbed by the TES system in the compression process. Consequently, more thermal energy will be reused by the turbine and more electric energy will be discharged in the expansion process.

The relationship of the compressor's inlet air temperature $T_{inc}$ and exhaust air temperature $T_c$ is as follows:

$$T_c = T_{inc} \lambda^{\frac{\gamma-1}{\gamma}} \quad (16)$$

To establish the relationship of $T_c$ and the turbine's inlet air temperature $T_{int}$, a reasonable and applicable technique in engineering is to assume that the gap between them is a constant, indicated by $\Delta T_{c-t}$ which represents the efficacy of the TES system. The smaller the value of $\Delta T_{c-t}$ is, the better the efficacy of the TES is. Therefore, the relationship of $T_c$ and $T_{int}$ can be expressed as follows:

$$T_{inc} = T_{inc} \lambda^{\frac{\gamma-1}{\gamma}} + \Delta T_{c-t} \quad (17)$$

Substituting formula (17) to formula (14), the expression of the RCAES system's efficiency can be as follows which shows the relationship of the compression ratio and $\eta_{RCAES}$:

$$\eta_{RCAES} = \frac{c_1' z_1}{c_2 z_2 + c_3 z_3 - c_4 z_1} \quad (18)$$

where $c_1' = \frac{N_t \left(T_{inc} \lambda^{\frac{\gamma-1}{\gamma}} + \Delta T_{c-t}\right) \mu}{(\mu - 1)} \left(1 - \phi^{\frac{\mu-1}{\mu}}\right),$ and the expressions of $c_2 \sim c_4$ and $Z_1 \sim Z_3$ are as the above.

Additionally, to guarantee all stages of the compressor functions, the compression ratio A should satisfy constraint (17) as follows.

$$\sqrt[N_c]{\frac{p_{stor}^1}{p_{in,1}^{com}}} < \lambda < \sqrt[N_{cs}]{\frac{p_{stor}^1}{p_{in,1}^{com}}} \quad (19)$$

The above constraint guarantees that the pressure of the CASV could reach the maximum working pressure when all the stages work simultaneously.

2.3.2 The Impact of EAPT-$p_{val}$

In one aspect, the variety of EAPT $p_{val}(=p_{stor}^0)$ will affect the operation time of both compression and expansion processes. In another aspect, as the exhaust air pressure of the turbine's last stage and total stage number of the turbine both are fixed, the ratio of each stage of the turbine $\phi$ expressed as the formula (19) will increase and finally change the efficiency of the RCAES system.

$$\phi = \sqrt[N_t]{\frac{p_{val}}{p_{out,N_t}^{tur}}} \quad (20)$$

That is, $\phi$ will increase along with increasing of $p_{val}$. The impacts of the above two aspects both will affect the efficiency of the system. When the exhaust air pressure of the last stage of the turbine is fixed and denoted as $p_{out,N_t}^{tur}$, formula (20) could be substituted to formula (14) to replace $\phi$ in $c_1$ with the formula (20) so as to obtain an expression of the efficiency of the RCAES system over $\phi$ as follows:

$$\eta_{RCAES} = \frac{c_1'' z_1}{c_2 z_2 + c_3 z_3 - c_4 z_1} \quad (21)$$

where $$c_1'' = \frac{N_t \left(T_{inc} \lambda^{\frac{\gamma-1}{\gamma}} + \Delta T_{c-t}\right) \mu}{(\mu - 1)} \left(1 - \left(\sqrt[N_t]{\frac{p_{val}}{p_{out,N_t}^{tur}}}\right)^{\frac{\mu-1}{\mu}}\right),$$

the expressions of $c_2 \sim c_4$ and $Z_1 \sim Z_3$ are as the above.

2.3.3 the Impact of the Maximum Working Pressure (MWP) of CASV-$p_{stor}^1$

Similar to the impact of EAPT, the MWP $p_{stor}^1$ of CASV will affect the RCAES system's efficiency indirectly through changing its operation time. As the system efficiency $\eta_{RCAES}$ is a nonlinear function of $p_{stor}^1$.

Additionally, $p_{stor}^1$ also should satisfy the following constraint (22) to guarantee the efficiency of every stage of the compressor, i.e., the MWP of CASV is reached when all the stages work simultaneously.

$$p_{in,1}^{com} \lambda^{N_{cs}} < p_{stor}^1 < p_{in,1}^{com} \lambda^{N_c}$$

According to the above formulas (15), (18) and (21) provided by the embodiments of the present invention can be adopted to analyze the impacts of the key parameters of various processes on the efficiency of the whole RCAES system, so as to determine the parameter values with which the RCAES system could obtain a better efficiency.

Figure 2:
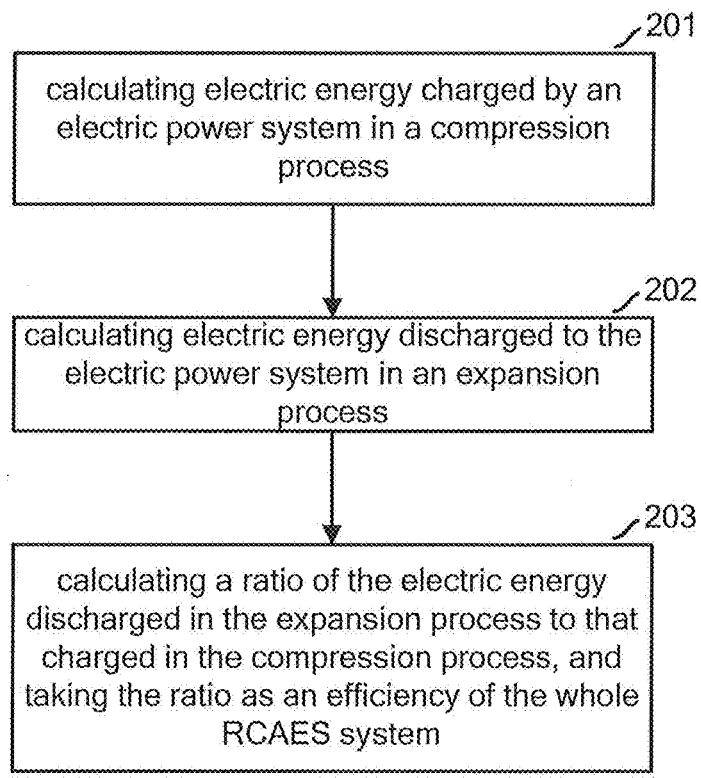
FIG. 2 is a flow chart of an efficiency evaluation method of the RCAES system in an embodiment of the present invention.

Based on the above solutions, an embodiment of the present invention provides an efficiency evaluation method of an RCAES system which includes parts of compression, thermal energy storage, CASV and expansion, and the method includes the following steps as shown in FIG. 2:

Block 201: calculating electric energy charged by an electric power system in a compression process.

Block 202: calculating electric energy discharged to the electric power system in an expansion process.

Block 203: calculating a ratio of the electric energy discharged in the expansion process to that charged in the compression process, and taking the ratio as an efficiency of the whole RCAES system.

Here, gas in operation is ideal gas, air mass flow rates in the compression and expansion processes are known and constant in operation, an isothermal model is adopted for the CASV of which the temperature is the same with ambient circumstances, and the temperature and pressure of compressed air after throttling become constant.

Specifically, a process of calculating the electric energy charged by the electric power system in the compression process may include the following steps:

calculating compression work of stages except the last stage of a compressor;

calculating compression work of the last stage of the compressor; and calculating the electric energy charged in the compression process according to the compression work of all the stages of the compressor.

Here, the stages except the last stage of the compressor are steady stages of the compressor while the last stage of the compressor is an unsteady stage of the compressor. And the compression work of all the stages of the compressor and the electric energy charged in the compression process may be calculated according to the formulas mentioned in Section 2.1, and the specific calculation method will not be described again hereinafter.

Specifically, a process of calculating the electric energy discharged to the electric power system in the expansion process may include the following steps:

calculating expansion work of the expansion process; and calculating the electric energy discharged to the electric power system according to the expansion work.

Here, the expansion work of the expansion process and the electric energy discharged to the electric power system may be calculated according to the formulas mentioned in Section 2.2, and the specific calculation method will not be described again hereinafter.

In an embodiment of the present invention, the method may further include the following steps:

determining an expression of a relation among the electric energy charged in the compression process, the pressure of the CASV and the compression ratio of each stage of a compressor;

determining an expression of a relation among the electric energy discharged in the expansion process, the pressure of the CASV and the maximum working pressure of the CASV;

determining an expression of a relation between the efficiency of the whole RCAES system and any of the compression ratio of each stage of the compressor, the exhaust air pressure of a throttle and the maximum working pressure of the CASV; and analyzing variation of the efficiency of the whole RCAES system under different values of the compression ratio of each stage of the compressor, the exhaust air pressure of a throttle or the maximum working pressure of the CASV according to the expression of the relation between the efficiency of the whole RCAES system and any of the compression ratio of each stage of the compressor, the exhaust air pressure of a throttle and the maximum working pressure of the CASV.

Here, the expression of the relation among the electric energy charged in the compression process, the pressure of the CASV and the compression ratio of each stage of the compressor has been discussed in Section 2.3, and it may be the following formula:

$$E_{com}(p_{stor}) = \frac{W_{N_{cs}}(p_{stor}) + W_{N_c}(p_{stor})}{\eta_{com}}$$

Herein, $$W_{N_c}(p_{stor}) = \alpha_1 \left[ \left( \frac{p_{stor}}{p_{in,N_c}^{com}} \right)^{\frac{2\gamma-1}{\gamma}} - \left( \frac{p_{stor}^0}{p_{in,N_c}^{com}} \right)^{\frac{2\gamma-1}{\gamma}} \right] - \alpha_2 (p_{stor} - p_{stor}^0),$$

$$\alpha_1 = \frac{T_{inc} V_{stor} \gamma^2 \lambda^{N_{cs}} p_{in,1}^{com}}{T_{stor}(2\gamma-1)(\gamma-1)}, \quad \alpha_2 = \frac{T_{inc} V_{stor} \gamma}{T_{stor}(\gamma-1)},$$

$$W_{N_{cs}}(p_{stor}) = \frac{V_{stor} \gamma (p_{stor} - p_{stor}^0)\left(\lambda^{\frac{\gamma-1}{\gamma}} - 1\right)}{T_{stor}(\gamma-1)} [T_{in,1}^{com} + (N_{cs} - 1)T_{inc}].$$

And the expression of the relation among the electric energy discharged in the expansion process, the pressure of the CASV and the maximum working pressure of the CASV has been discussed in Section 2.3, and it may be the following formula:

$$E_{tur}(p_{stor}) = W_{tur}(p_{stor})\eta_{tur}$$

Herein, $W_{tur}(p_{stor}) = \frac{N_t T_{int} \mu V_{stor}(p_{stor}^1 - p_{stor})}{T_{stor}(\mu-1)}\left(1 - \phi^{\frac{\mu-1}{\mu}}\right).$ Specifically, the expression of the relation between the efficiency of the whole RCAES system $\eta_{RCAES}$ and the compression ratio of each stage of the compressor may be formula (18) mentioned above.

Optionally, when analyzing the variation of the efficiency of the whole RCAES system under different values of the compression ratio of each stage of the compressor, the method may further include configuring a range of the value of the compression ratio to make the value of the compression ratio satisfy constraint (19) mentioned above.

Specifically, the expression of the relation between the efficiency of the whole RCAES system $\eta_{RCAES}$ and the exhaust air pressure of the throttle may be formula (21) mentioned above.

Specifically, the expression of the relation between the efficiency of the whole RCAES system $\eta_{RCAES}$ the maximum working pressure of the CAVS may be formula (15) mentioned above.

Optionally, when analyzing the variation of the efficiency of the whole RCAES system under different values of the maximum working pressure of the CASV, the method may further include configuring a range of the value of the maximum working pressure to make the value of the maximum working pressure satisfy constraint (22) mentioned above.

Figure 3:
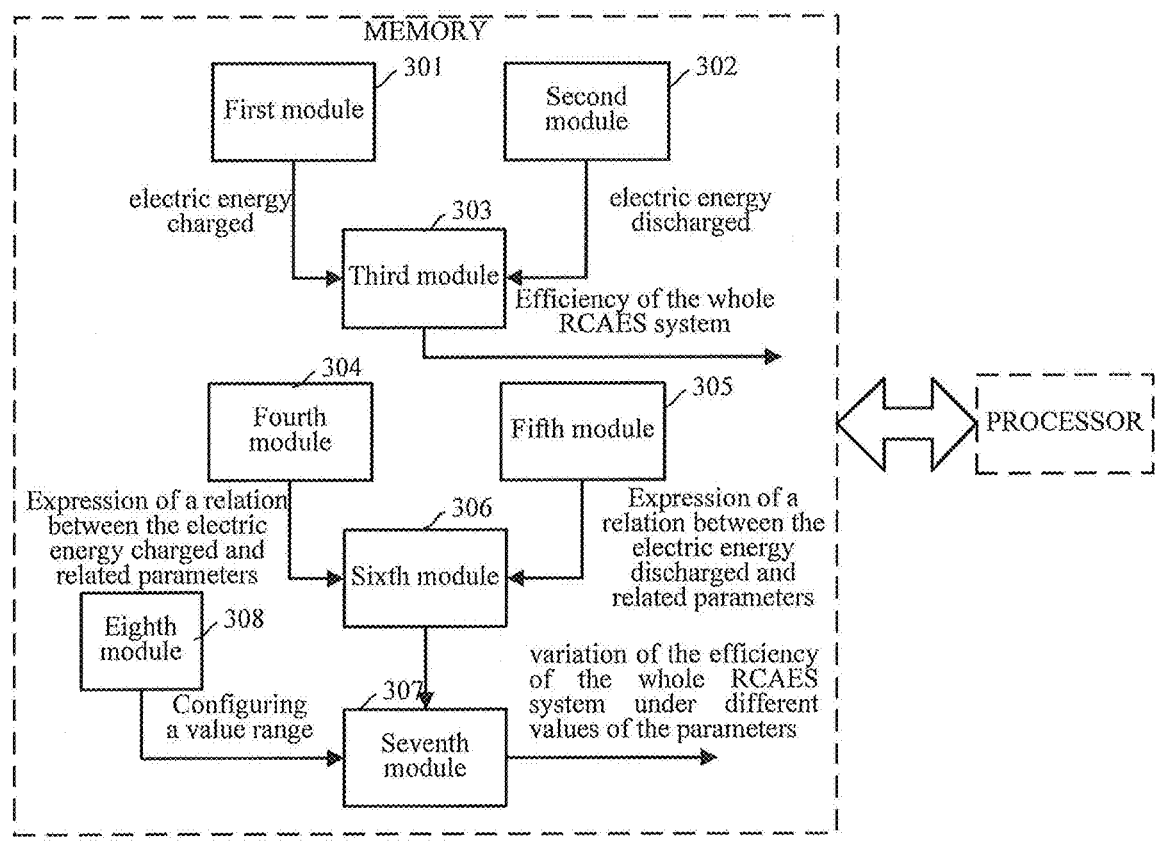
FIG. 3 is a diagram showing a structure of an efficiency evaluation system of the RCAES system in an embodiment of the present invention.

Based on the above method, an embodiment of the present invention provides an efficiency evaluation system of an RCAES system which includes parts of compression, thermal energy storage, compressed air storage vessel (CASV) and expansion. As shown in FIG. 3, the system includes the following modules:

A first module 301, for calculating electric energy charged by an electric power system in a compression process;

A second module 302, for calculating electric energy discharged to the electric power system in an expansion process; and A third module 303, for calculating a ratio of the electric energy discharged in the expansion process to that charged in the compression process, and taking the ratio as an efficiency of the whole RCAES system.

In the embodiment, gas in operation is ideal gas, air mass flow rates in the compression and expansion processes are known and constant in operation, an isothermal model is adopted for the CASV of which the temperature is the same with ambient circumstances, and the temperature and pressure of compressed air after throttling become constant.

Specifically, the first module may include sub-modules as follows:

A first sub-module, for calculating compression work of stages except the last stage of a compressor;

A second sub-module, for calculating compression work of the last stage of the compressor; and A third sub-module, for calculating the electric energy charged in the compression process according to the compression work of all the stages of the compressor.

Here, the stages except the last stage of the compressor are steady stages of the compressor while the last stage of the compressor is an unsteady stage of the compressor.

Specifically, the second module may include sub-modules: a first sub-module, for calculating expansion work of the expansion process; and a second sub-module, for calculating the electric energy discharged to the electric power system according to the expansion work.

As the specific calculation method of each sub-module has been discussed before, this will not be discussed again hereinafter.

In an embodiment of the present invention, the system may further include the following modules:

A fourth module 304, for determining an expression of a relation among the electric energy charged in the compression process, the pressure of the CASV and the compression ratio of each stage of a compressor;

A fifth module 305, for determining an expression of a relation among the electric energy discharged in the expansion process, the pressure of the CASV and the maximum working pressure of the CASV;

A sixth module 306, for determining an expression of a relation between the efficiency of the whole RCAES system and any of the compression ratio of each stage of the compressor, the exhaust air pressure of a throttle and the maximum working pressure of the CASV; and A seventh module 307, for analyzing variation of the efficiency of the whole RCAES system under different values of the compression ratio of each stage of the compressor, the exhaust air pressure of a throttle or the maximum working pressure of the CASV according to the expression of the relation between the efficiency of the whole RCAES system and any of the compression ratio of each stage of the compressor, the exhaust air pressure of a throttle and the maximum working pressure of the CASV.

As the expressions determined have been discussed before, this will not be discussed again hereinafter.

Optionally, when analyzing the variation of the efficiency of the whole RCAES system under different values of the compression ratio of each stage of the compressor, the system may further include an eighth module 308 for configuring a range of the value of the compression ratio to make the value of the compression ratio satisfy constraint (19) mentioned above, and/or configuring a range of the value of the maximum working pressure to make the value of the maximum working pressure satisfy constraint (22) mentioned above.

A machine-readable storage medium is also provided, which is to store instructions to cause a machine such as the computing device to execute one or more methods as described herein. Specifically, a system or apparatus having a storage medium that stores machine-readable program codes for implementing functions of any of the above examples and that may make the system or the apparatus (or CPU or MPU) read and execute the program codes stored in the storage medium.

The system shown in FIG. 3 may further include a memory and a processor, the memory stores instructions executable for the processor. The memory may include the modules 301~308, and through executing the instructions read from the modules 301~308, the processor can accomplish the functions of the modules 301~308 as mentioned above. Therefore, an efficiency evaluation system of the RCAES system including a memory and a processor is provided, where the memory stores instruction units executable for the processor, and the instruction units include any or any combination of the modules 301~308.

3. Case Study

The calculation method of the RCAES system's efficiency proposed in the embodiment of the present invention is applied to an example of the RCAES system, and the impacts of the key parameter of various processes on the efficiency of the whole system are also analyzed through this example.

3.1 System Introduction

Figure 4:
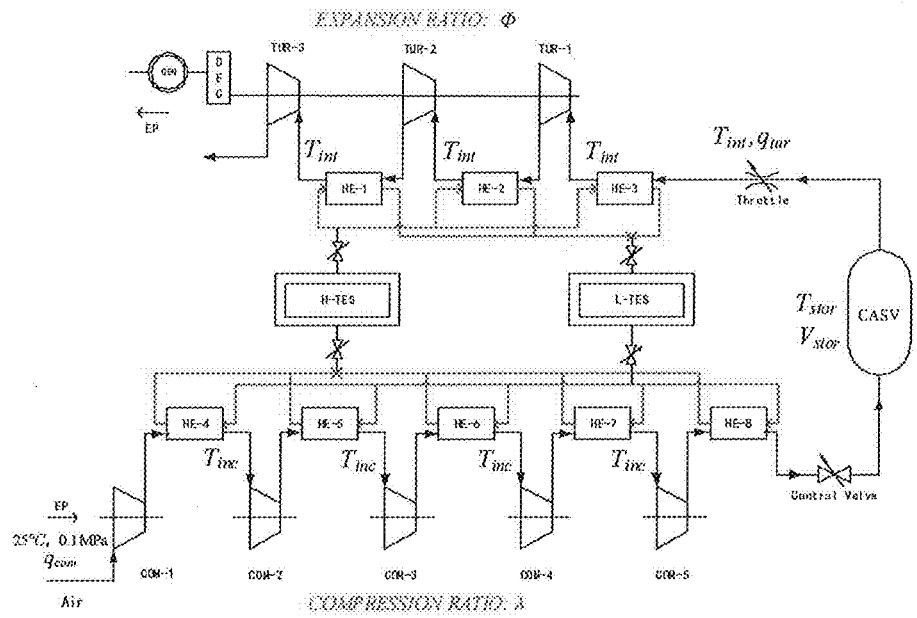
FIG. 4 is a diagram showing a practical structure of a RCAES system in an embodiment of the present invention.

FIG. 4 shows a structure of the example of the RCAES system. According to FIG. 4, the compressor includes 5 stages and the turbine includes 3 stages. The basic parameters are shown in Table 1 under the comprehensive consideration of the system's operation performance and construction cost.

TABLE 1

Parameters of Practical RCAES System

| Parameter | Value |
| --- | --- |
| $T_{in,1}^{com}$ (the inlet air temperature of the first stage of compressor) | 25° C. |
| $p_{in,1}^{com}$ (the inlet air pressure of the compressor) | 0.1 MPa |
| $\eta_{com}$ (the efficiency of the compression process) | 75% |
| $\eta_{tur}$ (the efficiency of the expansion process) | 75% |
| $T_{stor}$ (the temperature of CASV) | 20° C. |
| $\Delta T_{c-t}$ (the gap between the average inlet air temperature and the average exhaust air temperature) | 40° C. |
| $\gamma$ (the polytropic exponent of the compressor) | 1.4 |

TABLE 1-continued

Parameters of Practical RCAES System

| Parameter | Value |
|---|---|
| $T_{inc}$ (the inlet aire temperature of each stage except the first stage of compressor) | 86.35° C. |
| $p_{out,N_t}^{tur}$ (the exhaust air pressure of the last stage of turbine) | 0.11 MPa |
| $p_{stor}^{0}(p_{val})$ (the initial working pressure of CASV equal to the exhaust air pressure of the throttle) | 2.5 MPa |
| $p_{stor}^{1}$ (the maximum working pressure of CASV) | 10 MPa |
| λ (the compression ratio of each stage of compressor) | 3 |
| φ (the expansion ratio of each stage of turbine) | ⅓ |
| $q_{com}$ (the exhaust air rate of the compressor) | 0.46 kg/s |
| $q_{tur}$ (the exharust air rate of the turbine) | 2.41 kg/s |
| μ (the polytropic exponent of the turbine) | 1.4 |
| $V_{stor}$ (the volume of the CASV) | 100 m³ |

3.2 Efficiency Evaluation of RCAES System Under Basic Parameters

Figure 5:
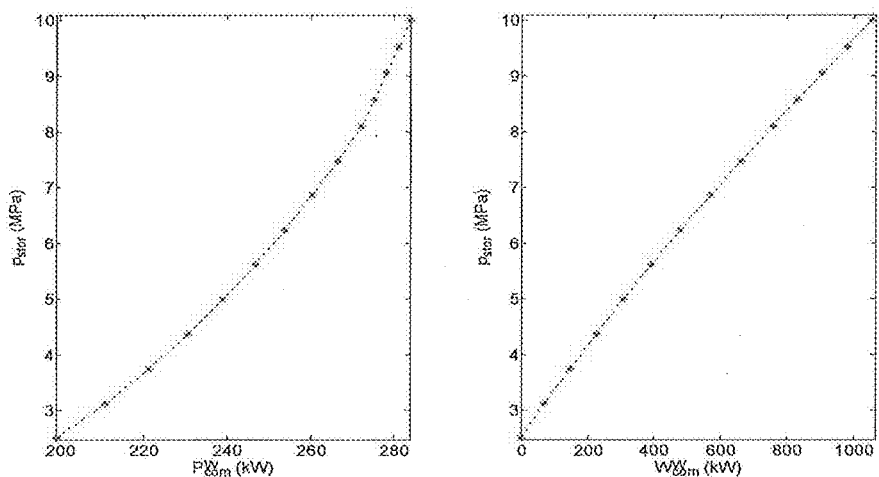
FIG. 5 is diagram showing operation characteristics of compression in the RCAES system in the embodiment of the present invention.

According to formulas (2) and (11), the compression process can be divided into two periods of which the first period takes 3.65 h and the second period takes 1.36 h, thus, the operation time of the whole compression process is 5.01 h, in which the air pressure of the CASV increases from 3 MPa to 10 MPa. The operation time of the expansion process is 1.14 h, in which the air pressure of the CASV decreases from 10 MPa to 3 MPa. And it is determined via calculation that the exhaust air pressure of the last stage of expansion process $p_{out,N_t}^{tur}$≈0.11 MPa. FIG. 5 shows the compression power/energy over $p_{stor}$ in the compression process, i.e., Operation Characteristics of Compression in the RCAES System, which is obtained via formulas (3)~(8).

As shown in FIG. 5, the working pressure of the CASV Astor increases over the compression power $P_{com}^{W}$ and the compression work $W_{com}^{W}$ nonlinearly, and the maximum electric power and electric energy charged into the RCAES system is 277.95 KW and 1407.55 KWh separately in the compression process according to formulas (3)~(9). According to formulas (10)~(13), it is determined that the electric power discharged by the RCAES system remains 705.10 KW and the maximum expansion work discharged is 567.92 KWh. The system efficiency then can be calculated as 40.35% according to formula (14).

3.3 the Impact of Compression Ratio

In the formulation of this part, all parameters excluding the compression ratio A of the RCAES system are given as the basic parameters given in Table 1, and λ may satisfy the following condition according to formula (19).

$$2.5119 \approx \sqrt[N_c]{\frac{p_{stor}^1}{p_{in,1}^{com}}} < \lambda < \sqrt[N_{cs}]{\frac{p_{stor}^1}{p_{in,1}^{com}}} \approx 3.1623$$

Thus, λ is fixed as the following given values successively:

2.6, 2.7, 2.8, 2.9, 3.0, 3.1

Figure 6:
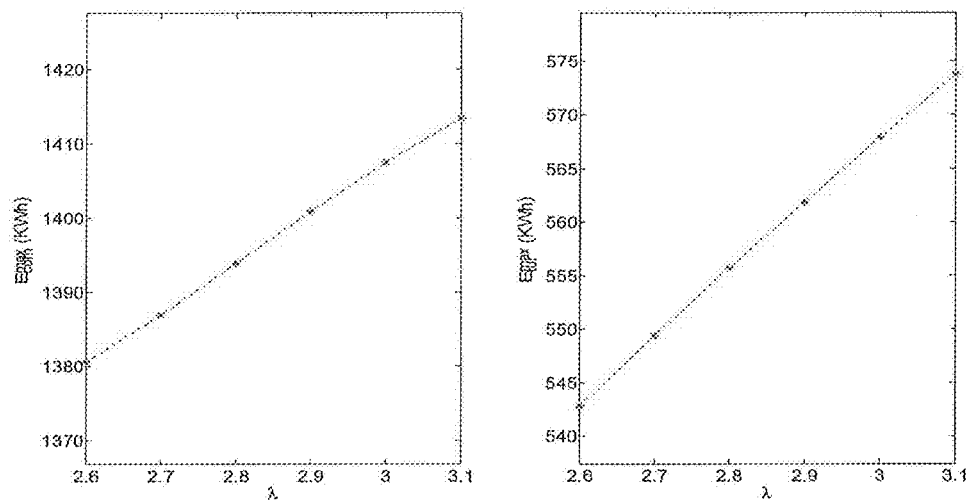
FIG. 6 shows electric energy exchanged in compression and expansion processes of the RCAES system under different values of compression ratio (A) of each stage of compressor in the embodiment of the present invention.

The electric energy charged in the compression process ($W_{com}^{max}=W_{com}(p_{stor}^{1})/\eta_{com}$) and discharged in the expansion process ($W_{tur}^{max}=W_{tur}(p_{stor}^{0})\eta_{tur}$) over different λ are given in FIG. 6, and they both are monotonically increasing along with increasing of λ. The curves in FIG. 6 are obtained according to formulas (3)~(13), (16) and (17). The RCAES system's efficiency $\eta_{RCAES}$ over different values of λ, i.e., the ratio of $E_{tur}^{max}$ and $E_{com}^{max}$ is given in FIG. 7 according formula (18).

Figure 7:
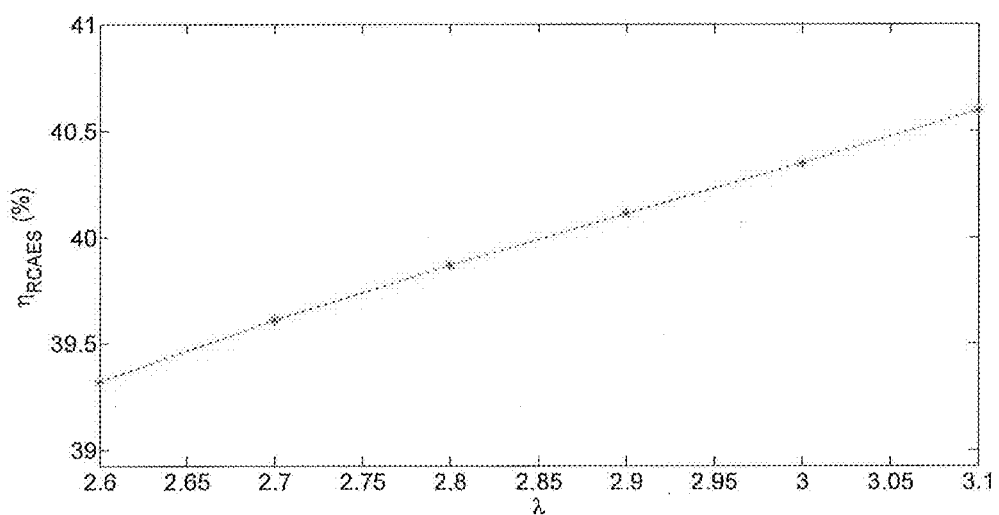
FIG. 7 shows efficiency of the RCAES system under different values of A in the embodiment of the present invention.

As shown in FIG. 7, the RCAES system's efficiency increases approximately linearly over λ partly because of the narrow feasible region of λ under the given design scheme, although the nonlinearity is indicated by formula (18).

As the compression ratio λ increases more thermal energy is released, resultantly, raising the temperature of High-Temperature TES. Accordingly, the inlet air temperature of the turbine is raised, implying that more electric energy will be discharged in the expansion process. The simulation result shows that there is more electric energy discharged than that charged with a larger λ, so that the efficiency of the RCAES system is increased.

3.4 the Impact of EAPT

In the formulation of this part, all parameters excluding the EAPT ($p_{val}$) are given as the basic parameters in Table 1. Although ($p_{val}$) may be given an arbitrary value in the range of 0.1 MPa~10 Mpa theoretically, ($p_{val}$) is fixed as the following given values successively in this formulation:

2.5 Mpa, 3 MPa, 3.5 MPa, . . . , 6.5 Mpa, 7 Mpa

Figure 8:
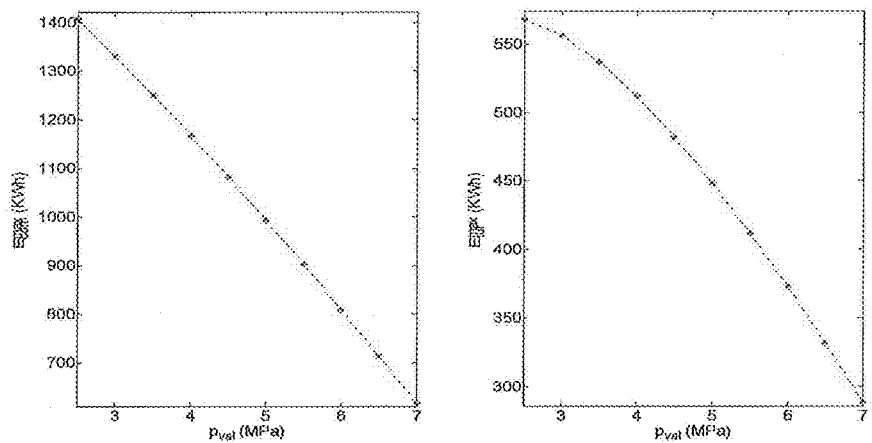
FIG. 8 shows electric energy exchanged in the compression and expansion processes of the RCAES system under different values of exhaust air pressure of throttle ($p_{val}$) in the embodiment of the present invention.
Figure 9:
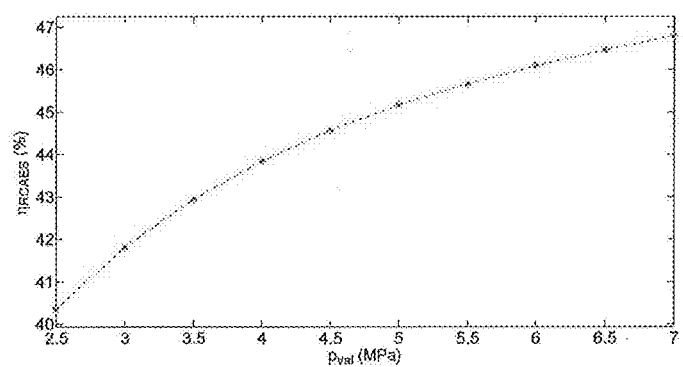
FIG. 9 shows efficiency of the RCAES system under different values of ($p_{val}$) in the embodiment of the present invention.

The simulation result is shown in FIG. 8, in which $E_{com}^{max}$ decreases approximately linearly over $p_{val}$ while $E_{tur}^{max}$ decreases nonlinearly over $p_{val}$. As the change rate of $E_{tur}^{max}$ is smaller than $E_{com}^{max}$, the system's efficiency increases nonlinearly as shown in FIG. 9 which is simulated according to formula (21), indicating that a larger value of $p_{val}$ causes less energy loss of the system in accordance with the simulation result in FIG. 9.

As analyzed in previous parts, the energy charged into the RCAES system are stored in the TES as high-temperature water on one hand and stored in the CASV as high-pressure air on the other hand. For the latter, more energy will be stored with higher pressure given the volume of the CASV. However, the high-pressure air becomes constant temperature and isopiestic after throttling, resulting in the decrement of the capability to work of air per unit mass. Furthermore, more energy loss will be caused by larger difference of the pressure after throttling according to the simulation result. Thus, increasing the value of $p_{val}$ will decrease the energy loss during throttling, thereby raising the efficiency of the whole RCAES system.

3.5 the Impact of the MWP of CASV

In the simulation of this part, all parameters excluding the MWP of CASV are given as the basic parameters in Table 1. According to formula (22), $p_{stor}^{1}$ may satisfy the following condition:

$$8.1 MPa = P_{in,1}^{com} \lambda^{N_{cs}} < p_{stor}^{1} < P_{in,1}^{com} \lambda^{N_c} = 40.5 MPa$$

Thus, $p_{stor}^{1}$ is fixed as the following given values successively in analysis of the impact of $p_{stor}^{1}$:

10 MPa, 15 MPa, . . . , 35 Mpa, 40 MPa

Figure 10:
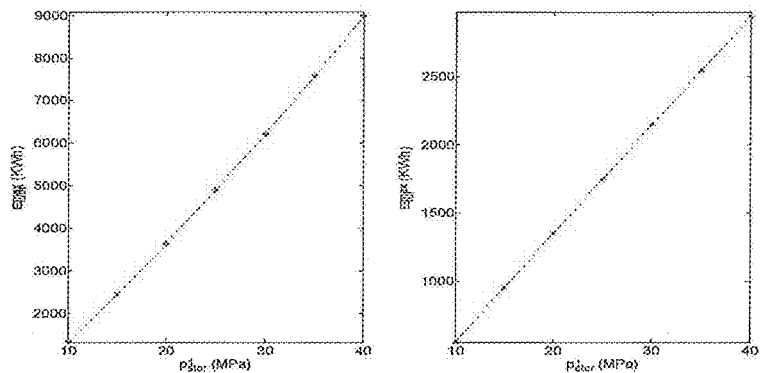
FIG. 10 shows electric energy exchanged in the compression and expansion processes of the RCAES system under different values of the maximum working pressure of compressed air storage vessel ($p_{stor}^1$) in the embodiment of the present invention.
Figure 11:
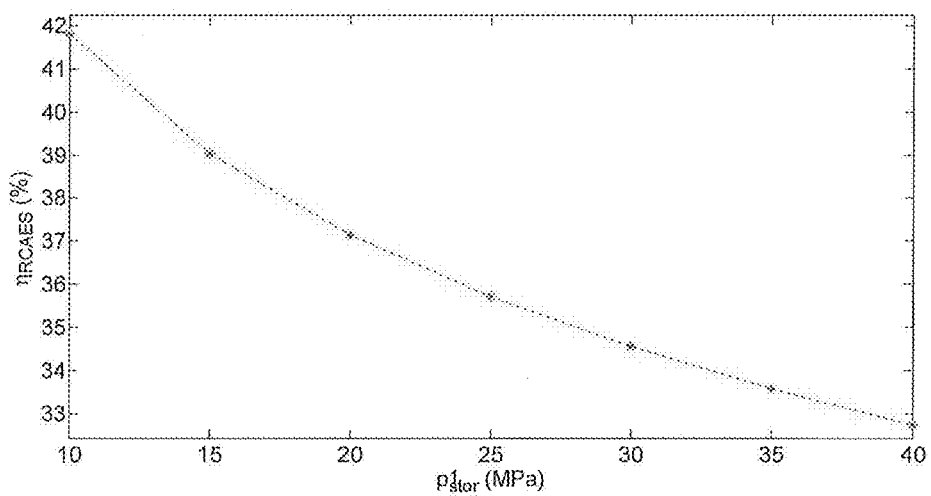
FIG. 11 shows efficiency of the RCAES system under different values of ($p_{stor}^1$) in the embodiment of the present invention.

FIG. 10 shows that the electric energy charged in the compression process and discharged in the expansion process both increase approximately linearly over $p_{stor}^{1}$ resulting in the system's efficiency decreasing nonlinearly over $p_{stor}^{1}$ as shown in FIG. 11.

Fixing $p_{val}$, the capability to work of the high-pressure air will diminish after throttling, leading to efficiency reduction of the RCAES system. The simulation result also shows that the loss is larger with a higher MWP of the CASV.

According to all simulation results through 3.1~3.5, a higher compression ratio, a higher EAPT and a lower MWP of the CASV in certain range can help improve the efficiency of the RCAES system.

However, the system efficiency is only one of the key indicators of the RCAES system, other key indicators, e.g., the maximum electric power, operation hours, the maximum capacity and construction costs may also be considered in practical engineering. The evaluation method proposed in the embodiments of the present invention can still be used as a foundation to accessing the operation performance.

The RCAES system is widely concerned in recent years, while research on its efficiency is very limited. Based on the electric-mechanical-thermal energy conversion process of the RCAES system and the basic thermodynamics assumptions, an efficiency evaluation method is proposed in the embodiments of the present invention which is validated by the typical design scheme of the RCAES system. Furthermore, the impacts of key parameters including the compression ratio, the EAPT, the MWP of the CASV may be analyzed in the embodiments of the present invention. The simulation results reveal variation tendency of the system efficiency over a certain range of these parameters.

The above description just shows several examples of the present disclosure in order to present the principle and implementation of the present application, and is in no way intended to limit the scope of the present application. Any modifications, equivalents, improvements and the like made within the spirit and principle of the present application should be encompassed in the scope of the present application.

What is claimed is:

1. An efficiency improving method of an RCAES (Regenerative Compressed Air Energy Storage) system which comprises parts of compression, thermal energy storage, compressed air storage vessel (CASV) and expansion executed by an efficiency evaluation system comprising a processor and a memory, the method comprising:
    calculating electric energy charged by an electric power system in a compression process;
    calculating electric energy discharged to the electric power system in an expansion process;
    calculating a ratio of the electric energy discharged in the expansion process to that charged in the compression process, and taking the ratio as an efficiency of the whole RCAES system;
    determining an expression of a relation among the electric energy charged in the compression process, the pressure of the CASV and the compression ratio of each stage of a compressor;
    determining an expression of a relation among the electric energy discharged in the expansion process, the pressure of the CASV and the maximum working pressure of the CASV;
    determining an expression of a relation between the efficiency of the whole RCAES system and any of the compression ratio of each stage of the compressor, the exhaust air pressure of a throttle and the maximum working pressure of the CASV; and
    configuring the compression ratio of each stage of the compressor, the exhaust air pressure of a throttle or the maximum working pressure of the CASV according to the expression of the relation between the efficiency of the whole RCAES system and any of the compression ratio of each stage of the compressor, the exhaust air pressure of a throttle and the maximum working pressure of the CASV, to improve the efficiency of the whole RCAES system;
    wherein gas in operation is ideal gas, air mass flow rates in the compression and expansion processes are known and constant in operation, an isothermal model is adopted for the CASV of which the temperature is the same with ambient circumstances, and the temperature and pressure of compressed air after throttling become constant.

2. The method of claim 1, wherein a process of calculating the electric energy charged by the electric power system in the compression process comprises:
    calculating compression work of stages except the last stage of a compressor;
    calculating compression work of the last stage of the compressor; and
    calculating the electric energy charged in the compression process according to the compression work of all the stages of the compressor;
    wherein the stages except the last stage of the compressor are steady stages of the compressor while the last stage of the compressor is an unsteady stage of the compressor.

3. The method of claim 2, wherein the compression work of the stages except the last stage of the compressor is calculated according to formula (1):

$$W_{N_{cs}} = \frac{V_{stor}\gamma(p_{stor}^1 - p_{stor}^0)\left(\lambda^{\frac{\gamma-1}{\gamma}} - 1\right)}{T_{stor}(\gamma - 1)}[T_{in,1}^{com} + (N_{cs} - 1)T_{inc}] \quad (1)$$

the compression work of the last stage of the compressor is calculated according to formula (2):

$$W_{N_c} = \alpha_1\left[\left(\frac{p_{stor}^1}{p_{in,N_c}^{com}}\right)^{\frac{2\gamma-1}{\gamma}} - \left(\frac{p_{stor}^0}{p_{in,N_c}^{com}}\right)^{\frac{2\gamma-1}{\gamma}}\right] - \alpha_2(p_{stor}^1 - p_{stor}^0) \quad (2)$$

herein, $\alpha_1 = \frac{T_{inc}V_{stor}\gamma^2\lambda^{N_{cs}}p_{in,1}^{com}}{T_{stor}(2\gamma - 1)(\gamma - 1)}$, $\alpha_2 = \frac{T_{inc}V_{stor}\gamma}{T_{stor}(\gamma - 1)}$;

the electric energy charged in the compression process is calculated according to formula (3):

$$E_{com} = \frac{W_{N_{cs}} + W_{N_c}}{\eta_{com}} \quad (3)$$

wherein meanings of parameter symbols in the above formulas are listed in a table as below:

| Parameter Symbol | Meaning |
|---|---|
| $W_{N_{cs}}$ | the compression power of the stages except the last stage of the compressor |
| $W_{N_c}$ | the compression power of the last stage of the compressor |
| $E_{com}$ | the electric energy charged in the compression process |

-continued

| Parameter Symbol | Meaning |
|---|---|
| $\eta_{com}$ | the efficiency of the compression process |
| $V_{stor}$ | the volume of the CASV |
| $p_{stor}^1$ | the maximum working pressure of the CASV |
| $p_{stor}^0$ | the initial working pressure of the CASV |
| $\lambda$ | the compression ratio of each stage of the compressor |
| $\gamma$ | the polytropic exponent of the compressor |
| $T_{in,1}^{com}$ | the inlet air temperature of the first stage of the compressor |
| $T_{inc}$ | the inlet air temperature of each stage other than the first stage of the compressor |
| $N_{cs}$ | the stage number of the penultimate stage |
| $p_{in,N_c}^{com}$ | the inlet air pressure of the last stage of the compressor |
| $q_{com}$ | the exhaust air rate of the compressor |
| $T_{stor}$ | the temperature of the CASV |

4. The method of claim 1, wherein a process of calculating the electric energy discharged to the electric power system in the expansion process comprises:
calculating expansion work of the expansion process; and
calculating the electric energy discharged to the electric power system according to the expansion work.

5. The method of claim 4, wherein the expansion work of the expansion process is calculated according to formula (4):

$$W_{tur} = \frac{N_t T_{int} \mu V_{stor}(p_{stor}^1 - p_{stor}^0)}{T_{stor}(\mu - 1)}\left(1 - \phi^{\frac{\mu-1}{\mu}}\right) \quad (4)$$

the electric energy discharged is calculated according to formula (5):

$$E_{tur} = W_{tur}\eta_{tur} \quad (5)$$

wherein meanings of parameter symbols in the above formulas are listed in a table as below:

| Parameter Symbol | Meaning |
|---|---|
| $W_{tur}$ | the expansion work of the expansion process |
| $E_{tur}$ | the electric energy discharged to the electric power system |
| $\eta_{tur}$ | the efficiency of the expansion process |
| $V_{stor}$ | the volume of the CASV |
| $p_{stor}^1$ | the maximum working pressure of the CASV |
| $p_{stor}^0$ | the initial working pressure of of the CASV |
| $\phi$ | the expansion ratio of each stage of turbine |
| $T_{int}$ | the inlet air temperature of each stage of turbine |
| $N_t$ | the number of stages of turbine |
| $\mu$ | the polytropic exponent of the turbine |
| $T_{stor}$ | the temperature of the CASV |

6. The method of claim 1, wherein the expression of the relation among the electric energy charged in the compression process, the pressure of the CASV and the compression ratio of each stage of the compressor is formula (6):

$$E_{com}(p_{stor}) = \frac{W_{N_{cs}}(p_{stor}) + W_{N_c}(p_{stor})}{\eta_{com}} \quad (6)$$

herein, $$W_{N_c}(p_{stor}) = \alpha_1\left[\left(\frac{p_{stor}}{p_{in,N_c}^{com}}\right)^{\frac{2\gamma-1}{\gamma}} - \left(\frac{p_{stor}^0}{p_{in,N_c}^{com}}\right)^{\frac{2\gamma-1}{\gamma}}\right] - \alpha_2(p_{stor} - p_{stor}^0),$$

$$\alpha_1 = \frac{T_{inc}V_{stor}\gamma^2\lambda^{N_{cs}}p_{in,1}^{com}}{T_{stor}(2\gamma-1)(\gamma-1)}, \alpha_2 = \frac{T_{inc}V_{stor}\gamma}{T_{stor}(\gamma-1)},$$

$$W_{N_{cs}}(p_{stor}) = \frac{V_{stor}\gamma(p_{stor} - p_{stor}^0)\left(\lambda^{\frac{\gamma-1}{\gamma}} - 1\right)}{T_{stor}(\gamma-1)}[T_{in,1}^{com} + (N_{cs}-1)T_{inc}];$$

the expression of the relation among the electric energy discharged in the expansion process, the pressure of the CASV and the maximum working pressure of the CASV is formula (7):

$$E_{tur}(p_{stor}) = W_{tur}(p_{stor})\eta_{tur} \quad (7)$$

herein, $W_{tur}(p_{stor}) = \frac{N_t T_{int} \mu V_{stor}(p_{stor}^1 - p_{stor})}{T_{stor}(\mu-1)}\left(1 - \phi^{\frac{\mu-1}{\mu}}\right);$ wherein meanings of parameter symbols in the above formulas are listed in a table as below:

| Parameter Symbol | Meaning |
|---|---|
| $W_{N_{cs}}$ | the compression work of the stages except the last stage of the compressor |
| $W_{N_c}$ | the compression work of the last stage of the compressor |
| $E_{com}$ | the electric energy charged in the compression process |
| $\eta_{com}$ | the efficiency of the compression process |
| $V_{stor}$ | the volume of the CASV |
| $p_{stor}$ | $p_{stor}^1$ the pressure of the CASV, the maximum working pressure of the CASV is denoted as $p_{stor}^1$ |
| $p_{stor}^0$ | the initial working pressure of the CASV which is equal to the exhaust air pressure of a throttle $p_{val}$ |
| $\lambda$ | the compression ratio of each stage of the compressor |
| $W_{tur}$ | the expansion work of the expansion process |
| $E_{tur}$ | the electric energy discharged in the expansion process |
| $\eta_{tur}$ | the efficiency of the expansion process |
| $\gamma$ | the polytropic exponent of the compressor |
| $T_{in,1}^{com}$ | the inlet air temperature of the first stage of the compressor |
| $T_{inc}$ | the inlet air temperature of each stage except the first stage of the compressor |
| $N_{cs}$ | the stage number of the penultimate stage |
| $p_{in,N_c}^{com}$ | the inlet air pressure of the |

-continued

| Parameter Symbol | Meaning |
|---|---|
| | last stage of the compressor |
| $q_{com}$ | the exhaust air rate of the compressor |
| $T_{stor}$ | the temperature of the CASV |
| $\phi$ | the expansion ratio of each stage of turbine |
| $T_{int}$ | the inlet air temperature of each stage of turbine |
| $N_t$ | the number of stages of turbine |
| $\mu$ | the polytropic exponent of the turbine |

7. The method of claim 6, wherein the expression of the relation between the efficiency of the whole RCAES system $\eta_{RCAES}$ and the compression ratio of each stage of the compressor is formula (8):

$$\eta_{RCAES}(\lambda) = \frac{c'_1 z_1}{c_2 z_2 + c_3 z_3 - c_4 z_1} \quad (8)$$

herein, $c'_1 = \frac{N_t(T_{inc}\lambda^{\frac{\gamma-1}{\gamma}} + \Delta T_{c-t})\mu}{(\mu-1)}\left(1 - \phi^{\frac{\mu-1}{\mu}}\right)$, $c_2 = \frac{\gamma[T^{com}_{in,1} + (N_{cs}-1)T_{inc}]}{(\gamma-1)}$, $c_3 = \frac{T_{inc}\gamma^2 p^{com}_{in,1}}{(2\gamma-1)(\gamma-1)}$, $c_4 = \frac{T_{inc}\gamma}{(\gamma-1)}$, $z_1 = p^1_{stor} - p^0_{stor}$, $z_2 = \left(\lambda^{\frac{\gamma-1}{\gamma}} - 1\right)(p^1_{stor} - p^0_{stor})$, $z_3 = \lambda^{N_{cs}}\left[\left(\frac{p^1_{stor}}{\lambda^{N_{cs}} p^{com}_{in,1}}\right)^{\frac{2\gamma-1}{\gamma}} - \left(\frac{p^0_{stor}}{\lambda^{N_{cs}} p^{com}_{in,1}}\right)^{\frac{2\gamma-1}{\gamma}}\right]$, $\Delta T_{c-t}$ is the gap between the average inlet air temperature and the average exhaust air temperature, and $p^{com}_{in,1}$ is the inlet air pressure of the compressor.

8. The method of claim 7, wherein when analyzing the variation of the efficiency of the whole RCAES system under different values of the compression ratio of each stage of the compressor, the method further comprises configuring a range of the value of the compression ratio to make the value of the compression ratio satisfy the following constraint:

$$\sqrt[N_c]{\frac{p^1_{stor}}{p^{com}_{in,1}}} < \lambda < \sqrt[N_{cs}]{\frac{p^1_{stor}}{p^{com}_{in,1}}}$$

9. The method of claim 6, wherein the expression of the relation between the efficiency of the whole RCAES system $\eta_{RCAES}$ and the exhaust air pressure of the throttle is formula (9):

$$\eta_{RCAES}(p_{val}) = \frac{c''_1 z_1}{c_2 z_2 + c_3 z_3 - c_4 z_1} \quad (9)$$

herein, $c''_1 = \frac{N_t(T_{inc}\lambda^{\frac{\gamma-1}{\gamma}} \Delta T_{c-t})\mu}{(\mu-1)}\left(1 - \left(\sqrt[N_t]{\frac{p_{val}}{p^{tur}_{out,N_t}}}\right)^{\frac{\mu-1}{\mu}}\right)$, $c_2 = \frac{\gamma[T^{com}_{in,1} + (N_{cs}-1)T_{inc}]}{(\gamma-1)}$; $c_3 = \frac{T_{inc}\gamma^2 p^{com}_{in,1}}{(2\gamma-1)(\gamma-1)}$, $c_4 = \frac{T_{inc}\gamma}{(\gamma-1)}$, $z_1 = p^1_{stor} - p^0_{stor}$, $z_2 = \left(\lambda^{\frac{\gamma-1}{\gamma}} - 1\right)(p^1_{stor} - p^0_{stor})$, $z_3 = \lambda^{N_{cs}}\left[\left(\frac{p^1_{stor}}{\lambda^{N_{cs}} p^{com}_{in,1}}\right)^{\frac{2\gamma-1}{\gamma}} - \left(\frac{p^0_{stor}}{\lambda^{N_{cs}} p^{com}_{in,1}}\right)^{\frac{2\gamma-1}{\gamma}}\right]$, $\Delta T_{c-t}$ is the gap between the average inlet air temperature and the average exhaust air temperature, and $p^{tur}_{out,N_t}$ is the exhaust air pressure of the last stage of turbine, and $p^{com}_{in,1}$ is the inlet air pressure of the compressor.

10. The method of claim 6, wherein the expression of the relation between the efficiency of the whole RCAES system $\eta_{RCAES}$ and the maximum working pressure of the CAVS is formula (10):

$$\eta_{RCAES}(p^1_{stor}) = \frac{c_1 z_1}{c_2 z_2 + c_3 z_3 - c_4 z_1} \quad (10)$$

herein, $c_1 = \frac{N_t T_{int}\mu}{(\mu-1)}\left(1 - \phi^{\frac{\mu-1}{\mu}}\right)$, $c_2 = \frac{\gamma[T^{com}_{in,1} + (N_{cs}-1)T_{inc}]}{(\gamma-1)}$, $c_3 = \frac{T_{inc}\gamma^2 p^{com}_{in,1}}{(2\gamma-1)(\gamma-1)}$, $c_4 = \frac{T_{inc}\gamma}{(\gamma-1)}$, $z_1 = p^1_{stor} - p^0_{stor}$, $z_2 = \left(\lambda^{\frac{\gamma-1}{\gamma}} - 1\right)(p^1_{stor} - p^0_{stor})$, $z_3 = \lambda^{N_{cs}}\left[\left(\frac{p^1_{stor}}{\lambda^{N_{cs}} p^{com}_{in,1}}\right)^{\frac{2\gamma-1}{\gamma}} - \left(\frac{p^0_{stor}}{\lambda^{N_{cs}} p^{com}_{in,1}}\right)^{\frac{2\gamma-1}{\gamma}}\right]$, $p^{com}_{in,1}$ is the inlet air pressure of the compressor.

11. The method of claim 10, wherein when analyzing the variation of the efficiency of the whole RCAES system under different values of the maximum working pressure of the CASV, the method further comprises configuring a range of the value of the maximum working pressure to make the value of the maximum working pressure satisfy the following constraint:

$$p^{com}_{in,1}\lambda^{N_{cs}} < p^1_{stor} < p^{com}_{in,1}\lambda^{N_c}$$

12. A non-transitory machine-readable storage medium, storing instructions to cause a machine to execute the method of claim 1.

13. An efficiency evaluation system of an RCAES (Regenerative Compressed Air Energy Storage) system which comprises parts of compression, thermal energy storage, compressed air storage vessel (CASV) and expansion; the system comprising:
 a processor, and a memory comprising instructions executable by the processor, where the instructions comprise:
 a first module, for calculating electric energy charged by an electric power system in a compression process;
 a second module, for calculating electric energy discharged to the electric power system in an expansion process;
 a third module, for calculating a ratio of the electric energy discharged in the expansion process to that charged in the compression process, and taking the ratio as an efficiency of the whole RCAES system;
 a fourth module, for determining an expression of a relation among the electric energy charged in the compression process, the pressure of the CASV and the compression ratio of each stage of a compressor;

a fifth module, for determining an expression of a relation among the electric energy discharged in the expansion process, the pressure of the CASV and the maximum working pressure of the CASV;

a sixth module, for determining an expression of a relation between the efficiency of the whole RCAES system and any of the compression ratio of each stage of the compressor, the exhaust air pressure of a throttle and the maximum working pressure of the CASV; and a seventh module, for configuring the compression ratio of each stage of the compressor, the exhaust air pressure of a throttle or the maximum working pressure of the CASV according to the expression of the relation between the efficiency of the whole RCAES system and any of the compression ratio of each stage of the compressor, the exhaust air pressure of a throttle and the maximum working pressure of the CASV, to improve the efficiency of the whole RCAES system;

wherein gas in operation is ideal gas, air mass flow rates in the compression and expansion processes are known and constant in operation, an isothermal model is adopted for the CASV of which the temperature is the same with ambient circumstances, and the temperature and pressure of compressed air after throttling become constant.

14. The system of claim 13, wherein the first module comprises:

a first sub-module, for calculating compression work of stages except the last stage of a compressor;

a second sub-module, for calculating compression work of the last stage of the compressor; and a third sub-module, for calculating the electric energy charged in the compression process according to the compression work of all the stages of the compressor;

wherein the stages except the last stage of the compressor are steady stages of the compressor while the last stage of the compressor is an unsteady stage of the compressor.

15. The system of claim 14, wherein the first sub-module calculates the compression work of the stages except the last stage of the compressor according to formula (1):

$$W_{N_{cs}} = \frac{V_{stor}\gamma(p_{stor}^1 - p_{stor}^0)\left(\lambda^{\frac{\gamma-1}{\gamma}} - 1\right)}{T_{stor}(\gamma - 1)}[T_{in,1}^{com} + (N_{cs} - 1)T_{inc}] \quad (1)$$

the second sub-module calculates the compression work of the last stage of the compressor according to formula (2):

$$W_{N_c} = \alpha_1\left[\left(\frac{p_{stor}^1}{p_{in,N_c}^{com}}\right)^{\frac{2\gamma-1}{\gamma}} - \left(\frac{p_{stor}^0}{p_{in,N_c}^{com}}\right)^{\frac{2\gamma-1}{\gamma}}\right] - \alpha_2(p_{stor}^1 - p_{stor}^0) \quad (2)$$

herein, $\alpha_1 = \frac{T_{inc}V_{stor}\gamma^2\lambda^{N_{cs}}p_{in,1}^{com}}{T_{stor}(2\gamma - 1)(\gamma - 1)}$, $\alpha_2 = \frac{T_{inc}V_{stor}\gamma}{T_{stor}(\gamma - 1)}$;

the third sub-module calculates the electric energy charged in the compression process according to formula (3):

$$E_{com} = \frac{W_{N_{cs}} + W_{N_c}}{\eta_{com}} \quad (3)$$

wherein meanings of parameter symbols in the above formulas are listed in a table as below:

| Parameter Symbol | Meaning |
| --- | --- |
| $W_{N_{cs}}$ | the compression power of the stages except the last stage of the compressor |
| $W_{N_c}$ | the compression power of the last stage of the compressor |
| $E_{com}$ | the electric energy charged in the compression process |
| $\eta_{com}$ | the efficiency of the compression process |
| $V_{stor}$ | the volume of the CASV |
| $p_{stor}^1$ | the maximum working pressure of the CASV |
| $p_{stor}^0$ | the initial working pressure of the CASV |
| $\lambda$ | the compression ratio of each stage of the compressor |
| $\gamma$ | the polytropic exponent of the compressor |
| $T_{in,1}^{com}$ | the inlet air temperature of the first stage of the compressor |
| $T_{inc}$ | the inlet air temperature of each stage other than the first stage of the compressor |
| $N_{cs}$ | the stage number of the penultimate stage |
| $p_{in,N_c}^{com}$ | the inlet air pressure of the last stage of the compressor |
| $q_{com}$ | the exhaust air rate of the compressor |
| $T_{stor}$ | the temperature of the CASV |

16. The system of claim 13, wherein the second module comprises:

a first sub-module, for calculating expansion work of the expansion process; and a second sub-module, for calculating the electric energy discharged to the electric power system according to the expansion work.

17. The system of claim 16, wherein the first sub-module calculates the expansion work of the expansion process according to formula (4):

$$W_{tur} = \frac{N_t T_{int}\mu V_{stor}(p_{stor}^1 - p_{stor}^0)}{T_{stor}(\mu - 1)}\left(1 - \phi^{\frac{\mu-1}{\mu}}\right) \quad (4)$$

the second sub-module calculates the electric energy discharged according to formula (5):

$$E_{tur} = W_{tur}\eta_{tur} \quad (5)$$

wherein meanings of parameter symbols in the above formulas are listed in a table as below:

| Parameter Symbol | Meaning |
| --- | --- |
| $W_{tur}$ | the expansion work of the expansion process |

-continued

| Parameter Symbol | Meaning |
|---|---|
| $E_{tur}$ | the electric energy discharged to the electric power system |
| $\eta_{tur}$ | the efficiency of the expansion process |
| $V_{stor}$ | the volume of the CASV |
| $p_{stor}^1$ | the maximum working pressure of the CASV |
| $p_{stor}^0$ | the initial working pressure of the CASV |
| $\phi$ | the expansion ratio of each stage of turbine |
| $T_{int}$ | the inlet air temperature of each stage of turbine |
| $N_t$ | the number of stages of turbine |
| $\mu$ | the polytropic exponent of the turbine |
| $T_{stor}$ | the temperature of the CASV |

18. The system of claim 13, wherein the fourth module determines that the expression of the relation among the electric energy charged in the compression process, the pressure of the CASV and the compression ratio of each stage of the compressor is formula (6):

$$E_{com}(p_{stor}) = \frac{W_{N_{cs}}(p_{stor}) + W_{N_c}(p_{stor})}{\eta_{com}} \quad (6)$$

herein, $$W_{N_c}(p_{stor}) = \alpha_1\left[\left(\frac{p_{stor}}{p_{in,N_c}^{com}}\right)^{\frac{2\gamma-1}{\gamma}} - \left(\frac{p_{stor}^0}{p_{in,N_c}^{com}}\right)^{\frac{2\gamma-1}{\gamma}}\right] - \alpha_2(p_{stor} - p_{stor}^0),$$

$$\alpha_1 = \frac{T_{inc}V_{stor}\gamma^2\lambda^{N_{cs}}p_{in,1}^{com}}{T_{stor}(2\gamma-1)(\gamma-1)}, \alpha_2 = \frac{T_{inc}V_{stor}\gamma}{T_{stor}(\gamma-1)},$$

$$W_{N_{cs}}(p_{stor}) = \frac{V_{stor}\gamma(p_{stor} - p_{stor}^0)\left(\lambda^{\frac{\gamma-1}{\gamma}} - 1\right)}{T_{stor}(\gamma-1)}[T_{in,1}^{com} + (N_{cs}-1)T_{inc}];$$

the fifth module determines that the expression of the relation among the electric energy discharged in the expansion process, the pressure of the CASV and the maximum working pressure of the CASV is formula (7):

$$E_{tur}(p_{stor}) = W_{tur}(p_{stor})\eta_{tur} \quad (7)$$

herein, $W_{tur}(p_{stor}) = \frac{N_t T_{int}\mu V_{stor}(p_{stor}^1 - p_{stor})}{T_{stor}(\mu-1)}\left(1 - \phi^{\frac{\mu-1}{\mu}}\right);$ wherein meanings of parameter symbols in the above formulas are listed in a table as below:

| Parameter Symbol | Meaning |
|---|---|
| $W_{N_{cs}}$ | the compression work of the stages except the last stage of the compressor |
| $W_{N_c}$ | the compression work of the last stage of the compressor |
| $E_{com}$ | the electric energy charged in the compression process |
| $\eta_{com}$ | the efficiency of the compression process |
| $V_{stor}$ | the volume of the CASV |
| $p_{stor}$ | $p_{stor}^1$ the pressure of the CASV, the maximum working pressure of the CASV is denoted as $p_{stor}^1$ |
| $p_{stor}^0$ | the initial working pressure of the CASV which is equal to the exhaust air pressure of a throttle $p_{val}$ |
| $\lambda$ | the compression ratio of each stage of the compressor |
| $W_{tur}$ | the expansion work of the expansion process |
| $E_{tur}$ | the electric energy discharged in the expansion process |
| $\eta_{tur}$ | the efficiency of the expansion process |
| $\gamma$ | the polytropic exponent of the compressor |
| $T_{in,1}^{com}$ | the inlet air temperature of the first stage of the compressor |
| $T_{inc}$ | the inlet air temperature of each stage except the first stage of the compressor |
| $N_{cs}$ | the stage number of the penultimate stage |
| $p_{in,N_c}^{com}$ | the inlet air pressure of the last stage of the compressor |
| $q_{com}$ | the exhaust air rate of the compressor |
| $T_{stor}$ | the temperature of the CASV |
| $\phi$ | the expansion ratio of each stage of turbine |
| $T_{int}$ | the inlet air temperature of each stage of turbine |
| $N_t$ | the number of stages of turbine |
| $\mu$ | the polytropic exponent of the turbine |

* * * * *